2 Sheets--Sheet 1.

C. G. BUSH.
Kaleidoscopes.

No. 151,005. Patented May 19, 1874.

Witnesses
Chas. R. Abell.
Geo. T. Smallwood, Jr.

Inventor.
Charles G. Bush,
by John J. Halsted
Atty.

C. G. BUSH.
Kaleidoscopes.

No. 151,005.

2 Sheets--Sheet 2.

Patented May 19, 1874.

Witnesses
Chas. R. Abell.
Geo. T. Smallwood Jr.

Inventor
Charles G. Bush
by John J. Halsted,
his Atty.

UNITED STATES PATENT OFFICE.

CHARLES G. BUSH, OF BOSTON, MASSACHUSETTS, ASSIGNOR OF ONE-HALF HIS RIGHT TO JOHN W. HOARD, OF PROVIDENCE, RHODE ISLAND.

IMPROVEMENT IN KALEIDOSCOPES.

Specification forming part of Letters Patent No. 151,005, dated May 19, 1874; application filed December 20, 1873.

*To all whom it may concern:*

Be it known that I, CHAS. G. BUSH, of Boston, Massachusetts, have invented Improvements in Kaleidoscope, of which the following is a specification:

My present invention consists in combining, with a rotating object-box, a means between the eye and object-box, for illuminating the objects, so that opaque objects, equally as well as transparent ones, may be employed, and their colors fully displayed. It further consists in uniting in the same instrument the requisites for displaying properly the true colors both of opaque and translucent objects; in other words, merging, virtually, the two characters of instruments into one. It further consists in combining, with a kaleidoscope having a revolving object-box, a variegated colored card-board or reflector, to be hung behind the instrument upon a stationary support, so that a background of any desired tint or color may be brought at will behind the object-glass, and thus give such background for the figure or design presented to the eye.

Figure 1:
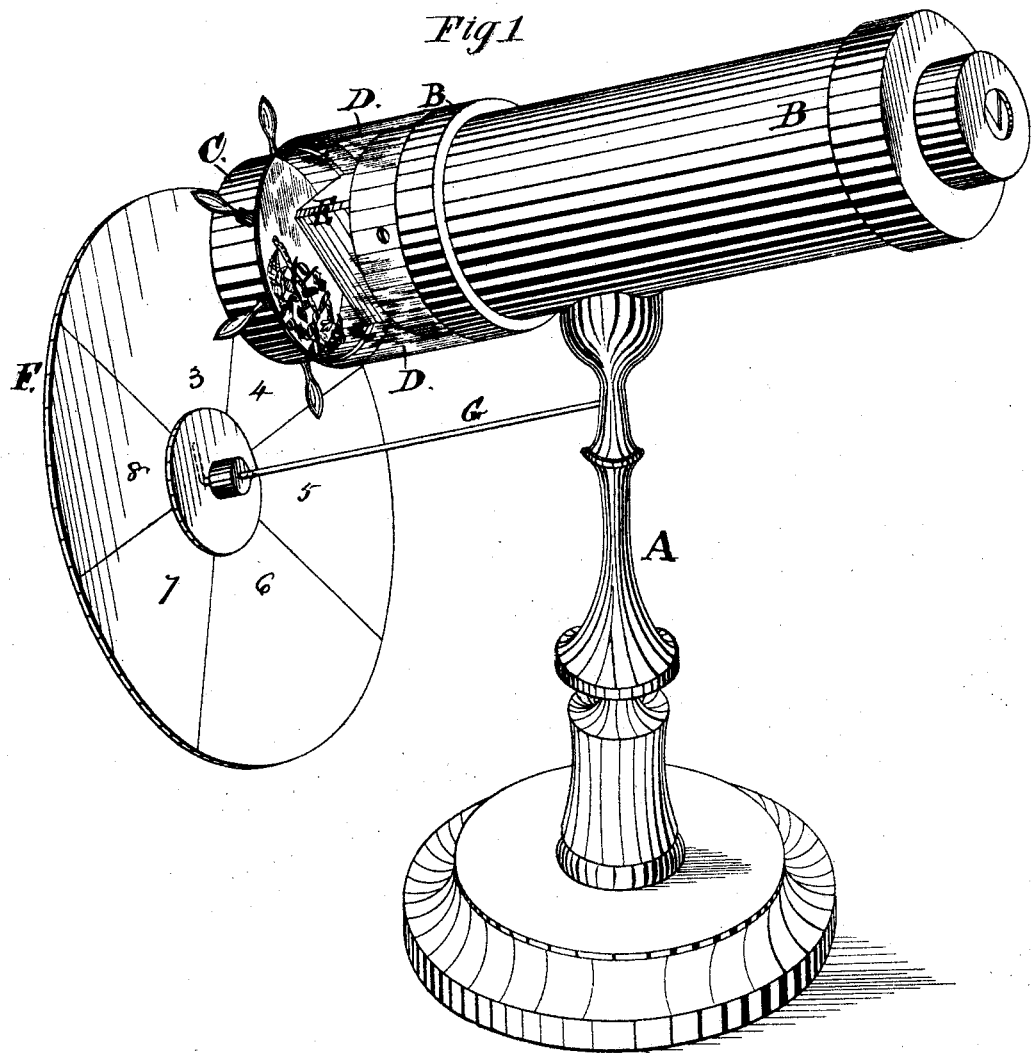
Figure 2:
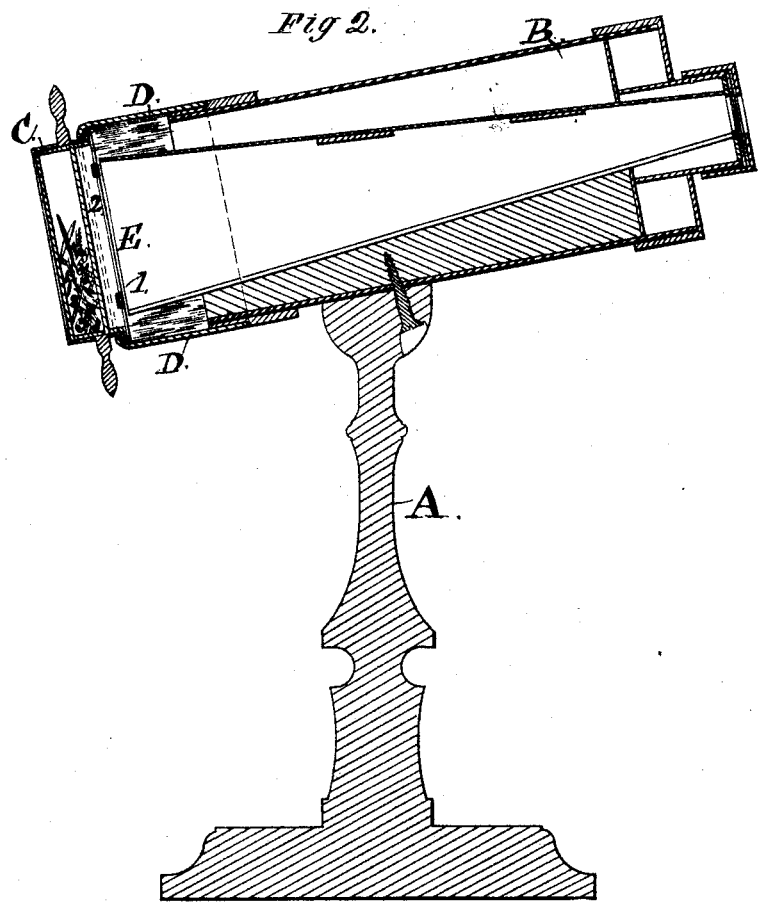
Figure 3:
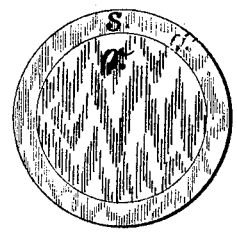

In the drawings which represent my improvements, A, Figs. 1 and 2, is a stand for supporting the instrument; B, the non-revolving part of the instrument; C, the object-box, containing a variety of opaque objects, such as buttons, nails, paper, metal rods, tinsel, tinfoil, gilt, cloth, pictures, strings, lace, &c.; and D, a glass band or rim, secured to the stationary part, and so shaped at its other end as to sustain the revolving box, and yet permit the free revolution or movement of the latter therein. The prism or triangular tube E has but two reflecting sides, its third or upper side being, preferably, of wood; for, as the prism does not revolve, there is no need of having any but those sides which form the lower angle capable of reflecting the objects. Besides, when all three sides of the prism are made to act as reflectors, the design formed by the objects in the instrument becomes improperly and but faintly reflected and multiplied in every side of the prism, and so tends to confuse the whole; and this defect I entirely avoid.

The light for illuminating the objects is admitted, at every side, through the glass at a point, as will be seen, between the object and the eye of the observer in using the instrument. This permits the rays of light to strike upon that side of the objects which, for the time being, is faced toward the eye, and thus to be reflected from such face direct to the eye, so that their true color is as distinctly seen as if they were held in the hand, or laid out upon a table.

It will be seen that the inner end of the prism reaches very nearly to the object-box. By causing the prism to reach, as seen, considerably beyond the end of the opaque tube which incases the greater part of its length, and by having the object-box near to this end of this prism, two ends are attained: First, a plentiful supply of light is admitted through the whole of the breadth of the glass rim, so that the rays shall fall upon the opaque objects at different parts, and from very many lines of direction, the better to display them; and secondly, those rays which fall upon them directly through the space 2 left between the end of the prism and the object-box fall upon them nearly perpendicularly, and the more perpendicular the rays of light can be thrown upon the objects the more will they become illuminated.

By my construction, although expressly designed to enable me successfully to employ and illumine opaque objects in connection with a revolving box, I am not precluded from also using, with the fullest effect, translucent ones; and, whenever desired, I supply the box with objects of both kinds, thus producing brilliant and charming novel combinations, the light which passes through the outer glass of the object-box serving to illuminate the transluent objects; or openings may be made around the tube toward its front end, and between it and the object-box.

My parti-colored reflector-card is shown, in Fig. 1, at F. Any colors desired may be placed upon it; and these may readily be changed at will, by pasting any other color over either colored section, 3 4 5 6, &c. I support this card upon a rod, G, which is removably secured into the stand, and the card may turn or revolve thereon. It may also be connected thereto by a universal joint, so as to stand in different planes relatively to the tube, as well as to turn on its axis.

I claim—

1. The combination, in a kaleidoscope for opaque objects, of an independent revolving object-box, supported in near proximity to the objective end of the prism, and a transparent tube surrounding the objective end of the prism, and also serving as the support of said revolving box.

2. The combination, with a kaleidoscope for opaque objects, as described, of an independent revolving object-box, whose ends are both of glass, either perfectly plain, or the outer one ground and the inner one clear, for use either with the transparent or opaque objects.

3. In combination with a kaleidoscope, the parti-colored reflecting card-board, adjustable, by rotation, to afford a series of backgrounds of any desired color, substantially as shown and described.

CHARLES G. BUSH.

Witnesses:
JOHN C. PURKIS,
HENRY A. GRIMWOOD.